United States Patent [19]
Nakagawa et al.

[11] Patent Number: 5,528,392
[45] Date of Patent: Jun. 18, 1996

[54] IMAGE-FORMING APPARATUS HAVING LIQUID CRYSTAL AND PHOTOCONDUCTIVE MEMBERS AND USING THE SAME LIGHT BEAM FOR READING AND WRITING

[75] Inventors: Kenichi Nakagawa; Koichi Kimura; Mitsuru Sawano, all of Shizuoka; Nobuo Matsumoto, Kanagawa; Mitsuyoshi Ichihashi, Shizuoka, all of Japan

[73] Assignee: Fuji Photo Film Co., Ltd., Kanagawa, Japan

[21] Appl. No.: 255,717

[22] Filed: Jun. 7, 1994

[30] Foreign Application Priority Data

Jun. 7, 1993 [JP] Japan ................................. 5-160029
Dec. 28, 1993 [JP] Japan ................................. 5-354570

[51] Int. Cl.$^6$ .................. G02F 1/135; G02F 1/1335; G03B 27/72; G02B 26/08
[52] U.S. Cl. ................ 359/41; 359/71; 359/72; 359/212; 359/226; 355/71
[58] Field of Search ................ 355/71; 359/72, 359/40, 41, 200, 212, 226, 53, 71

[56] References Cited

U.S. PATENT DOCUMENTS

| | | | |
|---|---|---|---|
| 4,239,385 | 12/1980 | Hujer | 355/71 |
| 4,783,146 | 11/1988 | Stephany et al. | 359/72 |
| 4,941,735 | 7/1990 | Moddel et al. | 359/72 |
| 5,056,897 | 10/1991 | Akiyama et al. | 359/72 |
| 5,227,886 | 7/1993 | Efron et al. | 359/72 |
| 5,245,626 | 9/1993 | Burke et al. | 372/92 |
| 5,367,359 | 11/1994 | Takanashi et al. | 355/71 |

FOREIGN PATENT DOCUMENTS 64-10819  2/1989  Japan .

OTHER PUBLICATIONS

Grinberg et al., "A New Real–Time Non–Coherent to Coherent Light Image Converter The Hybrid Field Effect Liquid Crystal Light Valve", Optical Engineering, vol. 14, No. 3, May–Jun. 1975, pp. 217–225.
Liquid Crystal Device Handbook, section on "Beam Addressing System:", Kubota, 1989, pp. 434–436 (Nikkan Industrial Press).
"Image Presentation Optical Systems With Local Spatial Modulation of Blinding Objects", Japan Display '92, A. P. Onoknov, J. N. Tanakin and M. G. Tomilin, 1992, pp. 543–545 (The Society for Information Display and The Institute of Television Engineers of Japan).
"Spatial Light Modulators Using Light Scattering Liquid–Crystal Composites", NHK Giken R & D, No. 12, Takizawa, Kikuchi and Fujikake, 1991, pp. 11–24 (NHK Press).
Liquid Crystals–Applications, Chapter 10: "Photoconductive Liquid Crystal Displays", Okano and Kobayashi, 1985, pp. 223–228 (Baifukan).

*Primary Examiner*—Anita Pellman Gross
*Assistant Examiner*—Walter J. Malinowski
*Attorney, Agent, or Firm*—Sughrue, Mion, Zinn, Macpeak & Seas

[57] ABSTRACT

An image-forming apparatus for exposing a photosensitive material with image light. An optical modulation device is provided such that the intensity of image light made incident from one side of an optical modulator is modulated in correspondence with the intensity of the image light made incident from the other side of the optical modulator as well as a drive voltage to be applied, and the image light made incident from one side is made emergent from the optical modulator. Since the modulation of the intensity of the image light is effected by the optical modulator, the amount of exposure supplied to a printing paper is controlled in correspondence with the density distribution of the image on a negative film, and an image having appropriate contrast can be reproduced by effective use of the latitude of the printing paper.

19 Claims, 7 Drawing Sheets

IMAGE-FORMING APPARATUS HAVING LIQUID CRYSTAL AND PHOTOCONDUCTIVE MEMBERS AND USING THE SAME LIGHT BEAM FOR READING AND WRITING

BACKGROUND OF THE INVENTION

1. Field of the Invention

The present invention relates to an image-forming apparatus having the function of converting the tone of an image.

2. Description of the Related Art

In an image-forming apparatus having the function of exposing and printing an image recorded on a photographic film onto a photographic printing paper, for instance, it is necessary to match the latitude of the printing paper with a density range of the image recorded on the photographic film.

The contrast characteristic of an image recorded on a photographic film is determined by conditions at the time of recording, and this image is exposed onto a black-and-white printing paper, a color printing paper or the like.

Various tones ranging from a hard gradation to a soft gradation are available for black-and-white printing papers. When a black-and-white image is exposed, a printing paper having a tone suitable to the contrast of the image on the photographic film or the photographer's intent is selected.

Meanwhile, as for color printing papers, printing papers having different tones as in the case of the black-and-white printing papers are not available, and only printing papers having single tones are available. Accordingly, when a color image is exposed, the amount of exposure is only adjusted in such a manner as to match as much as possible the latitude of the density that can be expressed by the printing paper. Therefore, it is very rare that special efforts for obtaining a print of an optimum tone are made.

Furthermore, as soft gradation enhancement in accordance with the intent of the person who prepares the print, there are cases where a print is prepared in which the average density of the overall image plane is lowered, i.e., a print of a so-called high-key tone.

In a case where exposure is effected by converting the tone of an image on a photographic film to a softer tone, exposure is effected by inserting a mask having a reversed brightness pattern of an original image into the optical path of an optical system which makes up the image-forming apparatus. On the other hand, in a case where exposure is effected by changing the tone to a harder tone, exposure is effected by inserting a mask having a pattern which is identical to the brightness pattern of the original image into the optical path.

In addition, as a contrast-correcting method which does not employ a mask, a technique is known in which a liquid crystal panel having electrodes arranged in the form of a matrix is inserted into the optical path, and the transmittance of pixels is controlled to obtain a desired amount of light, as disclosed in Japanese Patent Publication No. 10819/1989. This method makes it possible to correct the contrast of an exposed image by controlling the voltage applied to the electrodes.

Image processing for suppressing the sharpness of an image is attained by scattering the image light which has passed through a photographic film and exposing the printing paper.

The scattered light of the image light is obtained by using a soft focus filter or a liquid crystal having a scattering effect. In the case where the soft focus filter is used, exposure is effected by inserting the soft focus filter into the optical path in the same way as the above-described contrast correcting method.

In a case where exposure is effected with respect to a black-and-white printing paper, although printing papers of various tones are available as described above, it does not necessary follow that printing papers of desired tones are available. On the other hand, in a case where exposure is effected on a color printing paper, substantial time and labor are required for the preparation of an appropriate mask corresponding to the image and for the inserting operation of the mask, so that skill is required.

Furthermore, in the case where exposure is effected with respect to a color printing paper by inserting the aforementioned liquid crystal panel into the optical path instead of the mask, it is necessary to control the applied voltage for each region. Hence, there is a problem in that the circuit configuration consequently becomes complex.

Accordingly, with the image-forming apparatuses of a quality which meets the standards of the market, it is difficult to effect exposure by correcting the contrast easily.

In addition, the suppression of the sharpness of the image is attained by using a soft focus filter or a liquid crystal having a scattering effect, as described above. In the case where the soft focus filter is used, substantial time and labor are required for the selection of a soft focus filter having an appropriate scattering coefficient and for the inserting operation of the soft focus filter. In the case where the liquid crystal is used, it is necessary to control the voltage applied to the liquid crystal. In the case of a liquid crystal panel arranged in the form of a matrix, it is necessary to control the applied voltage for each region.

SUMMARY OF THE INVENTION

Accordingly, it is an object of the present invention to provide an image-forming apparatus capable of easily forming an image whose tone is converted to an appropriate tone in correspondence with the density of the image.

In accordance with a first aspect of the present invention, there is provided an image-forming apparatus having an image-forming portion upon which image light incident, comprising: optical modulation means including a photoconductive member and a liquid crystal member which are electrically connected in series and are optically connected to each other, wherein a tone conversion rate of the liquid crystal member changes in correspondence with the intensity of the image light made incident upon the photoconductive member, and the image light is modulated in correspondence with an intensity distribution of the image light by a change in the tone conversion rate of the liquid crystal member, so as to allow the image light to emerge toward the image-forming portion.

In accordance with a second aspect of the present invention, there is provided an image-forming apparatus having an image-forming portion upon which image light incident, comprising: optical modulation means including a photoconductive member and a liquid crystal member which are electrically connected in series and are optically connected to each other, wherein a tone conversion rate of the liquid crystal member changes in correspondence with the intensity of the image light incident upon the photoconductive member, and the image light is modulated in correspondence with an intensity distribution of the image light by a change in the tone conversion rate of the liquid crystal member, so as to allow the image light to be made emerge toward the image-forming portion; a first guide member for guiding the image light to the optical modulation means; and a second guide member for guiding the image light modulated by the optical modulation means to the image-forming portion.

In accordance with a third aspect of the present invention, in the first and second aspects of the present invention, the liquid crystal member forms image light whose tone is converted by modulating the intensity of the emergent image light.

In accordance with a fourth aspect of the present invention, in the first and second aspects of the present invention, the liquid crystal member forms image light whose tone is converted by modulating the scattering rate of the emergent image light.

In accordance with a fifth aspect of the present invention, there is provided an image-forming apparatus having an image-forming portion upon which image light incidents, comprising: optical modulation means including a pair of image-light incident portions arranged in face-to-face relation with each other, the optical modulation means being disposed such that the intensity of the image light incident from one of the pair of image-light incident portions being modulated in correspondence with the intensity of the image light incident from the other of the pair of image-light incident portions and a drive voltage to be applied to the optical modulation means, and that the image light incident from one of the pair of image-light incident portions emerge from the optical modulation means; image-light incident means for making the image light incident upon both of the pair of image-light incident portions; and image-light guiding means for guiding the image light emerge from the optical modulation means to a photosensitive material.

In accordance with a sixth aspect of the present invention, in the fifth aspect of the present invention, there is further provided controlling means for controlling the optical modulation means in correspondence with a density distribution of the image light emerging from one of the pair of image-light incident portions so as to expose the photosensitive material with a predetermined exposure amount for allowing the density of the image light to correspond to the latitude of the density of the photosensitive material.

In accordance with the first to fourth aspects of the present invention, the light incident upon the optical modulation means is modulated in correspondence with the intensity of that light. Accordingly, when the image light incident upon the optical modulation means, the emergent light is modulated in correspondence with the density distribution of the image, i.e., the intensity of the image light.

Image-forming apparatuses using the aforementioned optical modulation means may have a surface exposure system, a moving-slit exposure system, or a spot-sequential exposure system, and it is possible to cite printers, cameras, scanners, or electronic cameras. The light modulated by the optical modulation means forms an image on a photosensitive material making up the image-forming apparatus or on an image-forming portion of a charge-coupled device or the like.

The first optical modulation means in accordance with the present invention is based on a spatial light modulating means having a structure in which a photoconductive layer, a light-shielding film, a reflection film, and a liquid crystal layer are sandwiched by a pair of transparent electrodes (refer to "Liquid Crystal Device Handbook" section on Beam Addressing System (by Takizawa, Kikuchi, and Fujikake), pp. 434–436 (1989), compiled by the Japan Society for the Promotion of Science).

Generally, the aforementioned spatial light modulating means modulates the light incident from a surface on the liquid-crystal-layer side toward the light-shielding film in correspondence with the intensity of the light made incident from another surface on the photoconductive-layer side toward the reflection film. The light made emergent after being modulated and the light incidenting upon the photoconductive layer for modulating and controlling the light incidenting upon the liquid crystal layer are optically separated from each other by means of the light-shielding film and the reflection film.

However, the first optical modulation means in accordance with the present invention, which is based upon the structure described above, causes the light incident from outside the optical modulation means to act on the photoconductive layer, i.e., a photoconductive member, and modulate the light incidenting upon the liquid crystal layer, i.e., a liquid crystal member, in correspondence with the intensity of the incident light. The modulated emergent light and the light for modulating and controlling the incident light are optically not separated since the light-shielding film is omitted and a low-reflectance reflection film is used or the reflection film is omitted.

When light acts on the photoconductive layer constituting a part of the optical modulation means, the impedance of the photoconductive layer declines. An electric field is then applied to that portion of the liquid crystal layer which corresponds to a declined-impedance portion. As a result, an electro-optic effect is produced in the liquid crystal layer, so that the optical modulation means modulates the incident light and allows it to emerge. The photoconductive layer of this optical modulation means is not divided into very small portions within the plane for light reception, and even if the photoconductive layer is continuous, its electrical conductivity in the planar direction is poor. Hence, the effect of optical modulation appears in correspondence with the intensity of the respective portions of the incident image light.

There are two types of optical modulation means in accordance with the present invention. One has a reflecting-type structure in which a low-reflectance reflection film is provided, and an electro-optic effect is produced in the liquid crystal layer as a transmitted bundle of rays, when made incident upon the reflection film, is made to act on the photoconductive layer, so as to allow the incident light to be reflected by the reflection film and emerge. The other has a transmitting-type structure in which the reflection film is omitted, and an electro-optic effect is produced in the liquid crystal layer as the incident light is made to act directly on the photoconductive layer, so as to allow the incident light to be transmitted through the optical modulation means and emerge therefrom. As an example of application to blinding-prevention eyeglasses, the latter transmitting-type optical modulation means is disclosed in A. P. Onoknov, J. N. Tarnakin, and M. G. Tomilin, "Image Presentation Optical Systems With Local Spatial Modulation of Blinding Objects," Japan Display '92, pp. 543–545, 1992.

In the above-described modulation means, since information on the light intensity distribution with continuous incident light corresponds directly to the emergent light, and its resolution is about 100 lines pairs/mm, it is possible to effect image-light modulation with a high imagewise resolution.

In addition, the second optical modulation means in accordance with the present invention includes a photoconductive cell of a segmented structure having a plurality of photoconductive portions that are electrically connected to each other in series and are disposed in optical correspondence with each other, as well as a liquid crystal cell of a segmented structure having a plurality of liquid crystal portions. The second optical modulation means has a structure in which light of an identical intensity distribution can be made incident upon the photoconductive cell and the liquid crystal cell, respectively.

When light is made to act on the photoconductive cell constituting a part of the optical modulation means, the impedance of the photoconductive cell declines. An electric field applied to the liquid crystal cell disposed in optical correspondence with the photoconductive cell changes. As a result, since the electro-optic effect is produced in the liquid crystal portions which modulate the light transmitted therethrough, so that the optical modulation means emits the light modulated in correspondence with the intensity distribution of the incident light.

In accordance with the fifth and sixth aspects of the present invention, the intensity of the light made incident from the reading side of the optical modulation means, i.e., from one side of the optical modulation means, is modulated in correspondence with the intensity of the image light made incident from the writing side, i.e., the other side of the optical modulation means, and the drive voltage applied. Since the image light made incident from the writing side has a density distribution corresponding to the image, the intensity of the modulated light also corresponds to that density distribution.

The spatial light modulator (hereafter referred to as the SLM) is arranged such that a photoconductive film, a light-shielding film, a dielectric mirror, and a liquid crystal whose liquid crystal molecules are oriented at a required angle by an orientation film are sandwiched in that order by a pair of glass substrates respectively having transparent electrodes facing each other (refer to "Liquid Crystal Device Handbook" section on Beam Addressing System, pp. 434–436 (1989), compiled by the Japan Society for the Promotion of Science; Takizawa, Kikuchi, and Fujikake: "Spatial Light Modulators Using Light Scattering Liquid-Crystal Composites," NHK Giken R & D, No. 12, pp. 11–24 (1991); and Okano and Kobayashi: "Liquid Crystals—Applications," Chapter 10: Photoconductive Liquid Crystal Displays, pp. 223–228 (1985)).

When light is made incident upon the photoconductive film constituting a part of the SLM, the impedance of the photoconductive film declines. An electric field is applied to that portion of the liquid crystal which corresponds to the light-incident portion owing to the change in impedance. As a result, an electro-optic effect is produced in the liquid crystal, so that the SLM modulates the light incident from the reading side, reflects the light by the dielectric mirror, and allows the light to be emergent from the reading side. The emergent light corresponds to the intensity of the light made incident from the writing side.

The controlling means controls the intensity of the light applied to the printing paper as well as the irradiating time so that the image to be exposed will be reproduced with the latitude of the printing paper, thereby setting a required amount of exposure. The light intensity is controlled by the drive voltage to be applied to the SLM, and the irradiating time is controlled by the voltage-applying time.

In addition, in accordance with the third to fifth aspects of the present invention, as the liquid crystal portions of the first optical modulation means and the second optical modulation means, it is possible to cite, respectively, liquid crystals for light intensity modulation such as a twisted nematic liquid crystal, a guest-host liquid crystal, and a surface-stabilized ferroelectric liquid crystal, and liquid crystals adapted to scatter light, such as a polymer dispersed liquid crystal and a dynamic scattering liquid crystal. Their modulation functions differ depending on the liquid crystal supported by the optical modulation means.

Namely, the optical modulation means which is provided with the twisted nematic liquid crystal, the guest-host liquid crystal, or the surface-stabilized ferroelectric liquid crystal by making use of their light-intensity modulating function modulates the intensity of the incident light and converts the tone of the image.

Meanwhile, the optical modulation means which is provided with the polymer dispersed liquid crystal or the dynamic scattering liquid crystal by making use of their light-scattering-rate modulating function modulates the scattering rate of the incident light and converts the tone of the image.

The twisted nematic liquid crystal is arranged such that a composition, in which a trace amount of a chiral substance for suppressing the occurrence of an inversely twisted domain is added to a nematic liquid crystal of a multicomponent mixture having positive dielectric anisotropy with 45° twisted molecules orientation, is sandwiched by a pair of opposing transparent electrodes provided with orientation treatment on a pair of glass substrates, respectively. Further, polarizing plates are provided at least on the outer sides of incident light-side and emergent light-side glass substrates, respectively.

In the optical modulation means having the twisted nematic liquid crystal, when the light transmitted through the polarizing plate provided on the incident light side is made incident upon the photoconductive portion, the polarizing direction optically changes, so that the intensity of the light made emergent after passing through the polarizing plate is modulated.

It is when the intensity of the incident light is strong, i.e., when the light transmitted through a low-density portion of the image is made incident upon the optical modulation means, that the polarizing direction becomes parallel with the polarizing direction of the incident light. At this time, if the emergent light-side polarizing plate is disposed perpendicularly to the incident light-side polarizing plate, the intensity of the light for forming an image at the image-forming portion becomes weak. Hence, the contrast of the image is suppressed, and soft gradation enhancement is effected in terms of the tone of the image.

Meanwhile, if the emergent light-side polarizing plate is disposed in parallel to the incident light-side polarizing plate, the intensity of the emergent light becomes strong when the intensity of the incident light is strong. Hence, the intensity of the light for forming an image at the image-forming portion becomes strong, so that the contrast of the image is emphasized, and hard gradation enhancement is effected in terms of the tone of the image.

The guest-host liquid crystal is arranged such that a liquid crystal, in which a dichroic dye is dissolved in a nematic liquid crystal of a multicomponent mixture with twisted molecules orientation, is sandwiched by a pair of opposing transparent electrodes provided with orientation treatment. Since dichroic dye molecules are aligned in parallel with nematic liquid crystal molecules, if an electric field is applied to the liquid crystal molecules to change the orientation, the orientation of the dichroic dye molecules also changes. The absorbance of light differs in the long-axis direction and short-axis direction of the dichroic dye molecules, respectively. This is referred to as dichroism.

The optical modulation means having a guest-host liquid crystal modulates the incident light intensity by a change in the light absorbance based on the orientation of the dichroic dye molecules. The light absorbance differs depending on the type of dichroic dye, and it is possible to fabricate a device for enhancing the contrast of the image and a device for suppressing the same by selecting the dichroic dye.

Namely, if a dye whose absorbance at the time of passing in the long-axis direction of the dye molecules is smaller than the absorbance at the time of passing in the short-axis direction is used (negative dichroism), the transmittance of a portion to which an electric field has been applied becomes larger than that of a remaining portion. Accordingly, since the intensity of the light for forming an image at the image-forming portion becomes strong, the contrast of the image is enhanced, so that hard gradation enhancement is effected in terms of the tone of the image.

On the other hand, if a dye whose absorbance at the time of passing in the long-axis direction of the dye molecules is greater than the absorbance at the time of passing in the short-axis direction is used (positive dichroism), the transmittance of a portion to which an electric field has been applied becomes smaller than that of a remaining portion. Accordingly, since the intensity of the light for forming an image at the image-forming portion becomes weak, the contrast of the image is suppressed, so that soft gradation enhancement is effected in terms of the tone of the image.

In the case of the optical modulation means in which the liquid crystal molecules are oriented perpendicularly to the substrate in a state in which no electric field is applied to a nematic liquid crystal having negative dielectric anisotropy, the polarity of the dichroism of the dye and the relationship between the enhancement and suppression of the contrast of the image are inversed. Table 1 shows the above-described results.

TABLE 1

| Dye | | Liquid Crystal Dielectric Anisotropy | |
|---|---|---|---|
| | | Positive | Negative |
| Dichroism | Positive | Contrast suppressed | Contrast enhanced |
| | Negative | Contrast enhanced | Contrast suppressed |

As for optical modulation means having a guest-host liquid crystal, there is a type which is provided with a polarizing plate and another type which is not provided with a polarizing plate. In the case of the optical modulation means not provided with the polarizing plate, the contrast of the emergent light is lower than that of the optical modulation means provided with the twisted nematic liquid crystal, there is an advantage in that the loss of the light in the optical modulation means is small.

The surface-stabilized ferroelectric liquid crystal is arranged such that a chiral smectic liquid crystal having a layer thickness of 1 to 2 μm is sandwiched by a pair of opposing transparent electrodes respectively provided with homogeneous treatment on a pair of glass substrates. The chiral smectic liquid crystal has the long axis of molecules inclined at a fixed angle to the layer, and if a pulse electric field of an appropriate polarity is applied to the chiral smectic liquid crystal, the long axis of the molecules is inversed in a direction symmetrical to the normal of the layer.

The optical modulation means having the surface-stabilized ferroelectric liquid crystal modulates the incident linear polarized light into elliptical polarized light or circular polarized light owing to a change in the inclination of the long axis of the liquid crystal molecules. When light having a parallel or perpendicular polarizing direction to the long-axis direction of the liquid crystal molecules passes through this liquid crystal, the polarized state of the light does not change. If a pulse electric field is applied to the liquid crystal and the long axis of the molecules is inverted, the light is modulated, and the light of a desired intensity is applied to the image-forming portion. Thus, the contrast of the image is controlled, and soft gradation enhancement is effected in terms of the tone of the image.

The polymer dispersed liquid crystal is a composite material in which high molecules in a solid state and a liquid crystal coexist in dispersed form. There are various ratios of the quantity of these phases and various three-dimensional relationships. In this liquid crystal, its scattering state changes in response to the electric field applied to the liquid crystal.

The optical modulation means having the polymer dispersed liquid crystal modulates the scattering rate of the incident light owing to the change in the scattering state of the liquid crystal. The degree of scattering is dependent on the material of the liquid crystal, conditions of fabrication of the orientation film, the cell (layer) thickness, applied voltage, and the like.

Namely, when the intensity of the incident light is strong, and the electric field applied to the liquid crystal is therefore strong, the degree of scattering of the liquid crystal becomes large. Since the image-forming width at the contour consequently expands, soft gradation enhancement is effected in terms of the tone of the image.

The dynamic scattering liquid crystal is arranged such that a liquid compound or a composition, in which 10 to 1000 ppm of an ionic substance is added to a nematic liquid crystal having negative dielectric anisotropy, is sandwiched by a pair of opposing transparent electrodes respectively provided with homotropic or homogeneous treatment on a pair of glass substrates. As a nematic liquid crystal, it is possible to cite, for instance, N-p-methylbenzylidene-p-butylaniline. As an ionic substance, it is possible to cite a quaternary ammonium salt or a alkyl pyridinium salt.

As the ionic substance to be added, it is possible to cite a quaternary organic ammonium salt such as tetrabutyl ammonium bromide. Here, carboxylate may be used as counter anion. In addition, a charge-transfer complex typified by tetracyanoquinodimethane or tetracyanoquinodimethane may be used an the inoic substance.

The orientation treatment is sufficient insofar as it exhibits a very small degree of light scattering when light is not incident. For instance, it is possible to cite silane coupling agent coating treatment or polymer coating treatment with a polyimide or the like, which may be provided with rubbing treatment as required. In addition, either a homotropic structure or homogeneous structure may be used. However, if the homotropic structure is adopted, there are advantages in that the transmittance when light is not incident is high, and that the three-dimensional symmetry in light scattering is excellent.

The optical modulation means having the dynamic scattering liquid crystal modulates the scattering rate of the incident light owing to a change of the scattering state of the liquid crystal. The degree of scattering is dependent on the material of the liquid crystal, conditions of fabrication of the orientation film, the cell (layer) thickness, applied voltage, and the like.

Namely, when the intensity of the incident light is strong, and the electric field applied to the liquid crystal is therefore strong, the degree of scattering becomes large. Since the image-forming width at the contour consequently expands, it is possible to obtain a printed image in which the degree of soft focus differs depending on the intensity of the image light.

The light diffusing power based on the scattering phenomenon of the dynamic scattering liquid crystal has a half-width of 5 to 50 degrees or more, and since the light diffusing power is controllable by the applied electric field, the tone can be converted in correspondence with the density of the image.

In accordance with the first to fourth aspects of the present invention, since optical modulation means whose rate of modulation changes in correspondence with the intensity of the incident light, it is possible to make emergent the image light whose tone is converted in correspondence with the density of the image.

The optical modulation means in accordance with the present invention is capable of modulating the emergent light in correspondence with the intensity of the incident light, and the incident light and the emergent light are optically continuous, a plurality of incident optical paths are not provided unlike the known spatial light modulation means requiring reading light and writing light. Accordingly, it is possible to convert the tone of the image with a simple optical system.

In accordance with the fifth and sixth aspects of the present invention, the amount of exposure supplied to the printing paper is controlled in correspondence with the density distribution of the image on the negative film, and an image of appropriate contrast can be reproduced by making effective use of the latitude of the printing paper.

The SLM for controlling the amount of exposure, without needing to be divided into regions, is capable of modulating the intensity of the light incident from the reading side in response to the intensity of the light incident from the writing side, and of making the light emergent. Accordingly, imagewise light adjustment is possible, and a high-resolution image can be exposed on the printing paper.

In addition, since the SLM does not need to be divided so as to be driven, arithmetic processing of the drive voltage supplied can be simplified.

The above and other objects, features and advantages of the present invention will become more apparent from the following detailed description of the invention when read in conjunction with the accompanying drawings.

DESCRIPTION OF THE PREFERRED EMBODIMENTS

Referring now to the accompanying drawings, a description will be given of an embodiment of the present invention.

Figure 1:
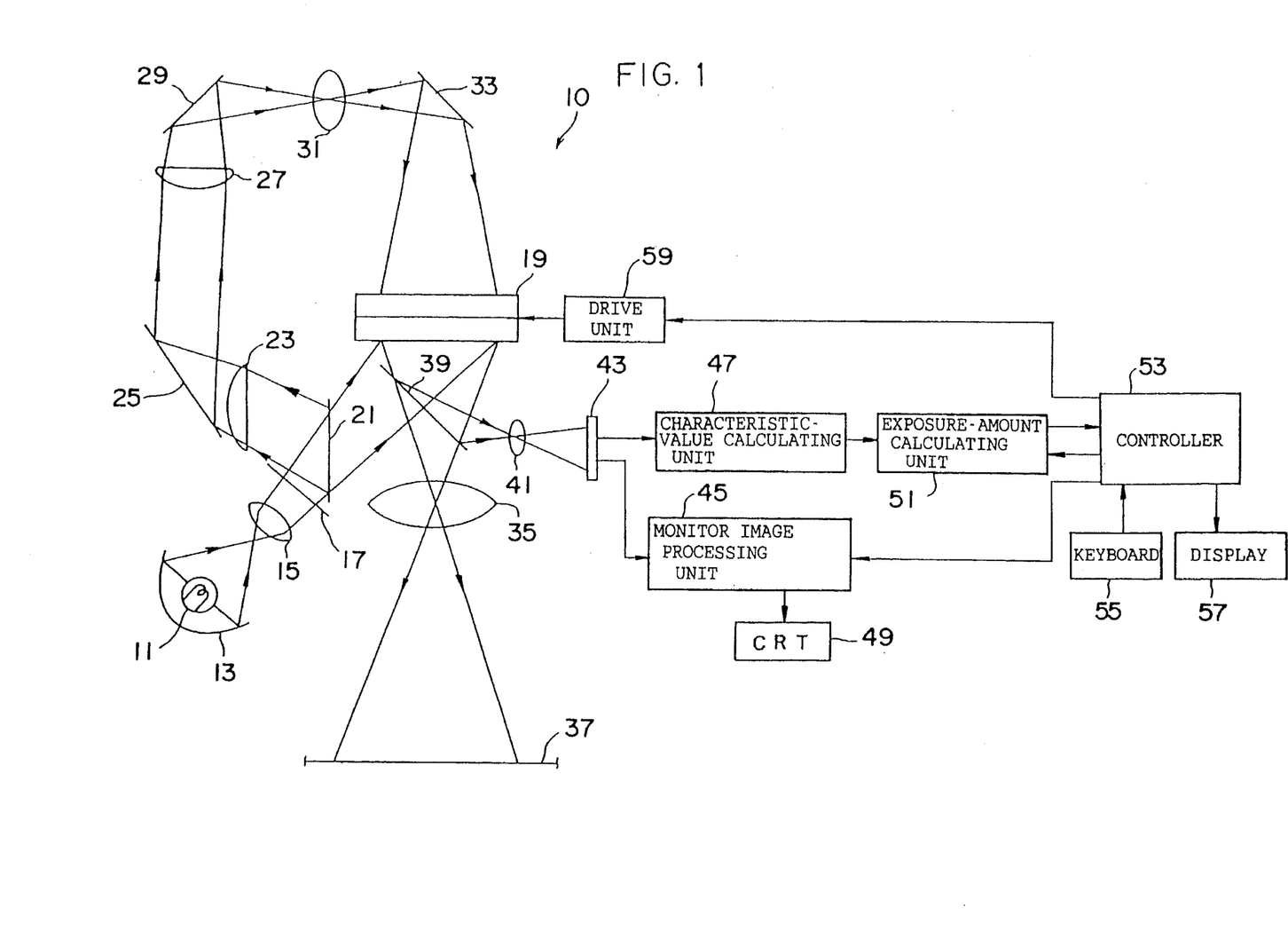
FIG. 1 is a schematic diagram of an image-forming apparatus in accordance with an embodiment of the present invention.

FIG. 1 shows an image-exposing apparatus 10 used in the present invention. Light from a light source 11 is reflected by a reflector 13, is passed through a lens 15, and incident upon a negative film 17. The light which has been transmitted through the negative film 17 is made incident upon a reading side of a spatial light modulator (hereafter referred to as the SLM) 19 serving as an optical modulation means. At the same time, part of the light which has been transmitted through the negative film 17 is reflected by a half mirror 21, passes along an optical path formed by a lens 23, a mirror 25, a lens 27, a mirror 29, a lens 31, and a mirror 33, and is made incident upon a writing side of the SLM 19.

Figure 2:
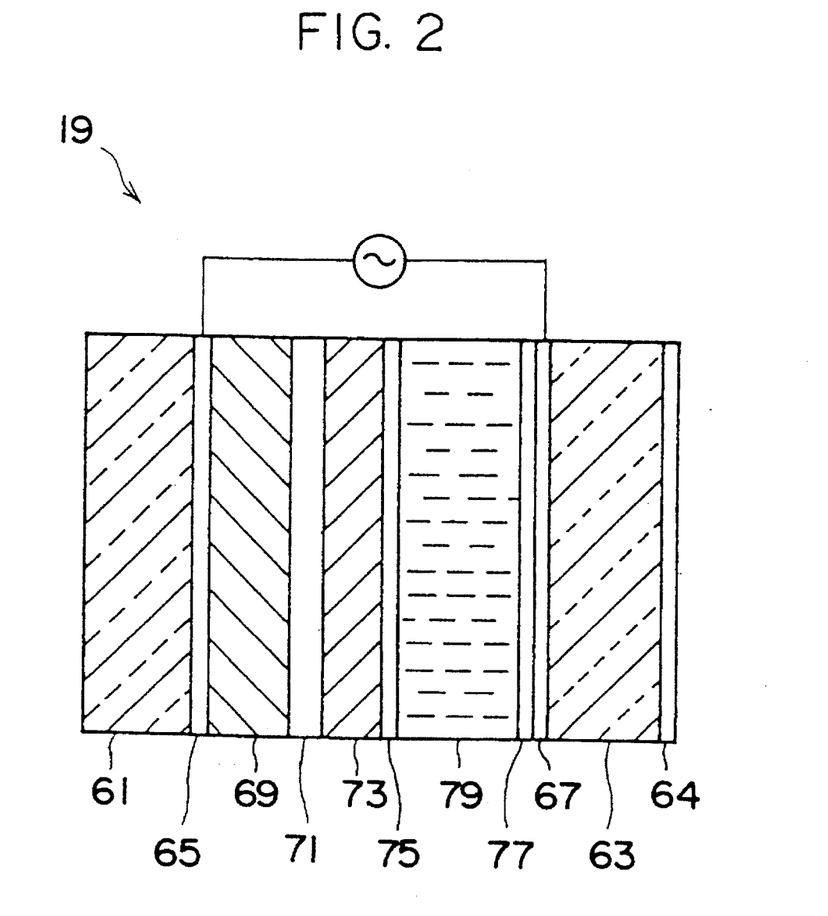
FIG. 2 is a diagram of a cross-sectional structure of a first example of an optical modulation means shown in FIG. 1.

Referring to FIG. 2, a description will be given of the SLM 19. As shown in FIG. 2, the SLM 19 is arranged such that a photoconductive film 69, a light-shielding film 71, a dielectric mirror 73, and a twisted nematic liquid crystal (hereafter referred to as the TN-type liquid crystal) 79, in which liquid crystal molecules are oriented at a predetermined angle by means of orientation films 75 and 77, are laminated in that order between a pair of glass substrates 61 and 63 respectively provided with indium tin oxide (ITO) transparent electrodes 65 and 67 facing each other. A drive voltage is applied to the transparent electrodes 65 and 67 by means of a drive unit 59 shown in FIG. 1. Further, the glass substrate 63 is provided with a deflection plate 64.

The operation of the SLM 19 will be described hereafter. When light is made incident from the writing side (the glass substrate 61 side) of the SLM 19, the impedance of the photoconductive film 69 is lowered in correspondence with the intensity of the light. An electric field corresponding to the distribution of the light intensity due to the change in impedance is applied to the liquid crystal 79 by the drive unit 59. That portion of the liquid crystal to which the electric field has been applied produces an electro-optic effect, and modulates the light made incident from the reading side (the glass substrate 63 side).

As shown in FIG. 1, the image light of the negative film 17 is made incident upon both the writing and reading sides of the SLM 19.

When the image light transmitted through the negative film 17 and reflected by the half mirror 21 is made incident upon the photoconductive film 69 constituting a part of the SLM 19, the impedance of that portion of the photoconductive film 69 upon which the image light has been made incident is lowered in correspondence with the light intensity. An electric field corresponding to the distribution of the light intensity due to the change in impedance is applied to the liquid crystal 79 corresponding to the incident portion by the drive unit 59. As a result, the orientation of the liquid crystal 79 changes in correspondence with the brightness pattern of the image on the negative film 17. The image light transmitted through both the negative film 17 and the half mirror 21 incidents upon the reading side, is modulated by the liquid crystal 79, reflected by the dielectric mirror 73, and emerges from the reading side.

The light thus emerge from the reading side corresponds to the brightness pattern of the image on the negative film 17, and this light is applied to a printing paper 37 via a lens 35. It should be noted that although the printing paper 37 is used in this embodiment, the present invention is not confined to the same, and other types of light-sensitive material may be used.

The image on the negative film 17 is exposed as described above, and it is necessary to cause the density range of the image on the negative film 17 to match the latitude of the density of the printing paper 37.

For instance, in a case where a person is photographed against a bright background, the difference in brightness between the background and the person is large, so that the difference in density of image portions on the negative film is large. If such an image on the negative film is exposed, there are cases where the density range of the image on the negative film 17 exceeds the latitude of the density that can be expressed by the printing paper. In that case, even if the amount of exposure is adjusted, only a print is obtained in which the color of the person's skin is darkened uniformly and the background is whitened.

In addition, in a case where a person is photographed against a dark background, the difference in brightness between the background and the person is small, so that the difference in density of image portions on the negative film is small. If such an image on the negative film is exposed, since only a portion of the latitude of the density that can be expressed by the printing paper is used, the print obtained lacks contrast.

Accordingly, in the case of the above-described photographing, it is necessary to enhance soft or hard gradation by correcting the contrast of the image on the negative film and to expose the film by making effective use of the density latitude of the printing paper. Meanwhile, depending on the intent of the person who prepares the print, there are cases where it is desirous to obtain a print in which the contrast is deliberately enhanced or suppressed.

The intensity of the light applied to the printing paper 37 can be controlled by the SLM 19. The intensity of the emergent light reflected from the SLM 19 responds to the distribution of intensity of the image light made incident from the writing side. By changing the response characteristic of the SLM 19 which responds to the light intensity, it is possible to correct the contrast of the image which is exposed on the printing paper 37.

Namely, the transmittance of the liquid crystal constituting a part of the SLM 19 is made small in a portion where the intensity of the light made incident upon the writing side is strong, thereby weakening the intensity of the emergent light. The contrast of the image exposed by using that emergent light is suppressed, so that soft gradation enhancement is thereby effected.

Alternatively, the transmittance of the liquid crystal constituting a part of the SLM 19 is increased in the portion where the intensity of the light made incident upon the writing side is strong, thereby increasing the intensity of the emergent light. The contrast of the image exposed by using that emergent light is enhanced, so that hard gradation enhancement is thereby effected.

The extent of contrast correction is determined by the characteristics of the SLM 19, e.g., the characteristics of the photoconductive film and the liquid crystal, as well as the drive voltage applied. The optical modulation means in this embodiment has the photoconductive film 69 and the light-shielding film 71 and is arranged such that the reading side and writing side of the optical modulation means are optically separated. By virtue of this arrangement, the light made incident upon the reading side is modulated in correspondence with the intensity of the light made incident from the writing side.

Next, referring to FIG. 1, a description will be given of contrast correction.

The emergent light from the SLM 19 is branched off by a half mirror 39, and the light reflected by the half mirror 39 passes through a lens 41 and is made incident upon an image area sensor 43.

The image area sensor 43 outputs an image signal to a monitor image processing unit 45, and outputs a photometric signal obtained by photometrically measuring the emergent light to a characteristic-value calculating unit 47.

The monitor image processing unit 45 performs negative/positive conversion, gradation correction, saturation correction, and the like, and causes an image in which a finished state of a print is simulated to be displayed on a cathode-ray tube (CRT) 49. The various correction data are entered from a keyboard 55 connected to a controller 53 which will be described later. The correction data thus inputted is displayed on a display 57 connected to the controller 53.

The characteristic-value calculating unit 47 calculates various characteristic values such as the density difference between a highlight portion and a shadow portion within the image, an average image-plane density, and the like, and outputs the results of the calculation to an exposure-amount calculating unit 51.

The exposure-amount calculating unit 51 calculates a density difference of the image plane of the printing paper and a required exposure amount for the printing paper which is set by the exposure light intensity and the exposure time on the basis of a formula for calculation of an exposure amount by using the results of calculation by the characteristic-value calculating unit 47 and, as required, correction data inputted from the keyboard 55. Then the exposure-amount calculating unit 51 outputs the results of the calculation to the controller 53.

The relationship between the image-plane density difference on the one hand, and the drive voltage and the exposure time on the other, is stored in advance in the memory of the controller 53. The drive voltage and the exposure time are determined by referring to the memory on the basis of the above results of calculation, whereby a required exposure amount is determined.

The controller 53 outputs a control signal to the drive unit 59 so that the determined drive voltage is applied to the SLM 19 by the drive unit 59 for a predetermined time corresponding to the exposure time.

The SLM 19 operates for a predetermined time by the determined drive voltage, thereby allowing the predetermined exposure amount to be supplied to the printing paper.

As for the relationship between the density difference of the image on the negative film 17 and the exposure amount, if, for instance, the density difference is large, the exposure amount is reduced to suppress the contrast of the image. Meanwhile, if the density difference is small, the exposure amount is increased to enhance the contrast of the image.

To provide finer correction of the contrast, the detected position and area of brightness are taken into consideration. For example, in a case where a brightest or darkest portion is detected at a marginal portion of the image plane, or in a case where a brightest or darkest portion with a very small area is detected at a central portion of the image plane, that brightest or darkest portion is ignored. Thus, the contrast can be corrected by taking the visual characteristic into consideration.

It should be noted that although, in the above-described embodiment, a description has been given of the case where the image light of the negative film 17 is made incident upon the reading side of the SLM 19, an arrangement may be provided such that uniform light which does not have image information is made incident upon the reading side, and the intensity of the light may be modulated before the light emerge. In this case, since the light is passed through the SLM, the color information is lost, so that it is necessary to write in the SLM the light whose three primary colors are separated, and to read from the SLM the image information modulated by the light of the same color.

Hereafter, a description will be given of another embodiment of the present invention with reference to FIG. 3.

Figure 3:
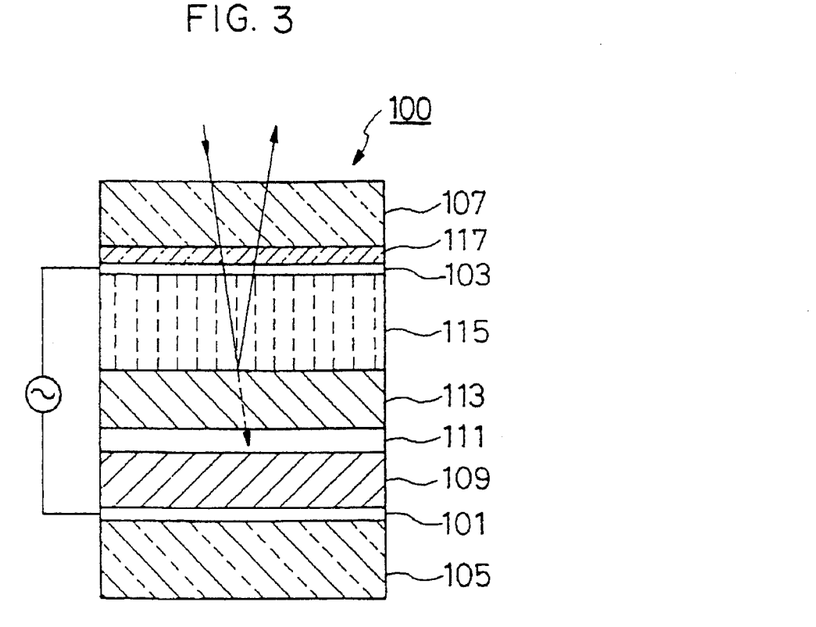
FIG. 3 is a diagram of a cross-sectional structure of a second example of the optical modulation means of the present invention.

FIG. 3 shows a second example of the optical modulation means used in the image-forming apparatus of the present invention. As shown in FIG. 3, an optical modulation means 100 is arranged such that a photoconductive layer 109, a filter 111, a reflection film 113, and a liquid crystal layer 115 are laminated in that order between a pair of glass substrates 105 and 107 respectively supporting an electrode 101 and an interference filter 117 and a transparent electrode 103 which are provided in such a manner as to face each other. A drive voltage is applied to the electrodes 101 and 103. It should be noted that, in FIG. 3, those component parts which are generally used in a liquid-crystal device, such as an orientation film, a seal, a spacer, or the like, are omitted.

Hereafter, the operation of the optical modulation means 100 will be described. The image light made incident from the glass substrate 107 side of the optical modulation means 100 is transmitted through the interference filter 117, the liquid crystal layer 115, and the reflection film 113, and reaches the photoconductive layer 109. The reflectance of the reflection film 113 is set in such a manner as to reflect part of the incident light and allow a remaining portion thereof to be transmitted therethrough.

When the light transmitted through the reflection film 113 reaches the photoconductive layer 109, the impedance of the photoconductive layer 109 declines in correspondence with the intensity of this light. An electric field corresponding to the distribution of the light intensity is applied to the liquid crystal layer 115 from the electrodes 101 and 103 due to the change in impedance. That portion of the liquid crystal to which the electric field has been applied produces an electro-optic effect. Accordingly, the light reflected by the reflection film 113, when transmitted through the liquid crystal layer 115, is modulated in correspondence with the distribution of the incident light intensity.

The above-described optical modulation means 100 is based upon the spatial light modulation means using a liquid crystal. The spatial light modulation means described in the first embodiment has a high-impedance photoconductive layer, and has a light-shielding layer instead of the filter 111 constituting a part of the aforementioned optical modulation means 100. By means of these members, the reading and writing sides of the spatial light modulation means of the first embodiment are optically separated. In addition, the light made incident upon the reading side emerges after being modulated in correspondence with the intensity of the light incidenting from the writing side.

However, the optical modulation means 100, which is based upon the spatial light modulation means of the second example having the above-described structure, does not have the above-described optically separated structure, and causes the bundle of rays transmitted through the reflection film 113 to act on the photoconductive layer 109. This optical modulation means 100 is characterized by being of a so-called self-modulating type in which it modulates the light reflected by the reflection film 113, in response to the intensity of the incident light.

Accordingly, in the optical modulation means 100, the electrode 101 is not required to be a transparent electrode, and may rather be formed of a metallic electrode having a light-shielding capability so as to avoid the malfunction of the optical modulation means 100 due to the fact that the stray light entering from the glass substrate 105 acts on the photoconductive layer 109.

The filter 111 constituting a part of the optical modulation means 100 has a spectrum-converting function whereby the spectrum of the bundle of rays transmitted through the reflection film 113 is matched with the sensitivity spectrum of the photoconductive layer 109. The interference filter 117 is provided to select from the image light the wavelengths of the light for modulation by this optical modulation means, and to reflect the other components of the light without modulating the same. It should be noted that the interference filter 117 may be omitted in a case where modulation is effected over the entire region of the spectrum of the image light.

Figure 4:
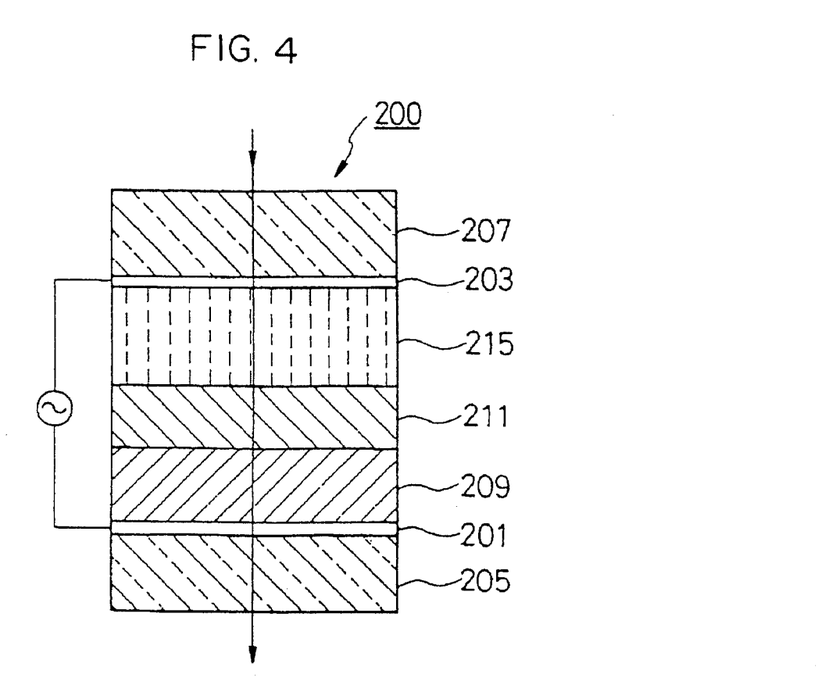
FIG. 4 is a diagram of a cross-sectional structure of a third example of the optical modulation means of the present invention.

Referring now to FIG. 4, a description will be given of a third example of the optical modulation means which is used in the image-forming apparatus of the present invention. As shown in FIG. 4, an optical modulation means 200 is arranged such that a photoconductive layer 209, a filter 211, and a liquid crystal layer 215 are laminated in that order between a pair of glass substrates 205 and 207 respectively supporting a transparent electrode 201 and a transparent electrode 203 which are provided in face-to-face relation with each other. A drive voltage is applied to the transparent electrodes 201 and 203.

Hereafter, a description will be given of the operation of the optical modulation means 200. The optical modulation means 200 of this example is also based upon the spatial light modulation means using a liquid crystal, and the image light made incident from the glass substrate 207 reaches the photoconductive layer 209.

When the incident light reaches the photoconductive layer 209, the impedance of the photoconductive layer 209 declines in correspondence with the intensity of this light. An electric field corresponding to the distribution of the light intensity is applied to the liquid crystal layer 215 from the transparent electrodes 201 and 203 owing to the change in impedance. That portion of the liquid crystal to which the electric field has been applied produces an electro-optic effect. Accordingly, the light transmitted through the liquid crystal layer 215 is modulated in correspondence with the distribution of the incident light intensity.

The above-described optical modulation means 200 does not have an optically separated structure in the same way as the above-described optical modulation means 100, but has a transmitting-type structure in which the light incidenting from one side of the optical modulation means 200 emerges to the other side, so as to allow the incident light to act on the photoconductive layer 209. Then, the optical modulation means 200 is characterized by modulating the light transmitted through the liquid crystal layer 215 in correspondence with the intensity of the light incidenting from one side of the optical modulation means.

The filter 211 constituting a part of the optical modulation means 200 has a spectrum-converting function in the same way as the filter 111 constituting a part of the optical modulation means 100 of the first example, whereby the spectrum of the bundle of rays made incident upon the photoconductive layer 209 is matched with the sensitivity spectrum of the photoconductive layer 209.

The transmittance of the optical modulation means 200 having the transmitted-type structure is wavelength-dependent, and the light transmitted through the optical modulation means 200 is colored by the sensitivity characteristic of the photoconductive layer 209.

Accordingly, in a case where the image light impinging upon the optical modulation means 200 contains color information, color-balance correction is required to match the color balance of the incident light with the color balance of the transmitted light. The color-balance correction is attained by the provision of a color filter inside or outside the optical modulation means 200.

In addition, in a case where light containing color information is separated, and the separated components of the light are respectively made incident upon the optical modulation means 200, are modulated, and are then synthesized, it is required that the color balance after synthesis be compensated. To compensate the color balance, the spectrum of a light source may be set in such a manner that the color balance is compensated when the light transmitted through the optical modulation means 200 is synthesized. Alternatively, it is possible to adjust the sensitivity spectrum of the photosensitive material or an image-forming portion of an image-receiving device to which the light transmitted through the optical modulation means 200 is applied.

Figure 5:
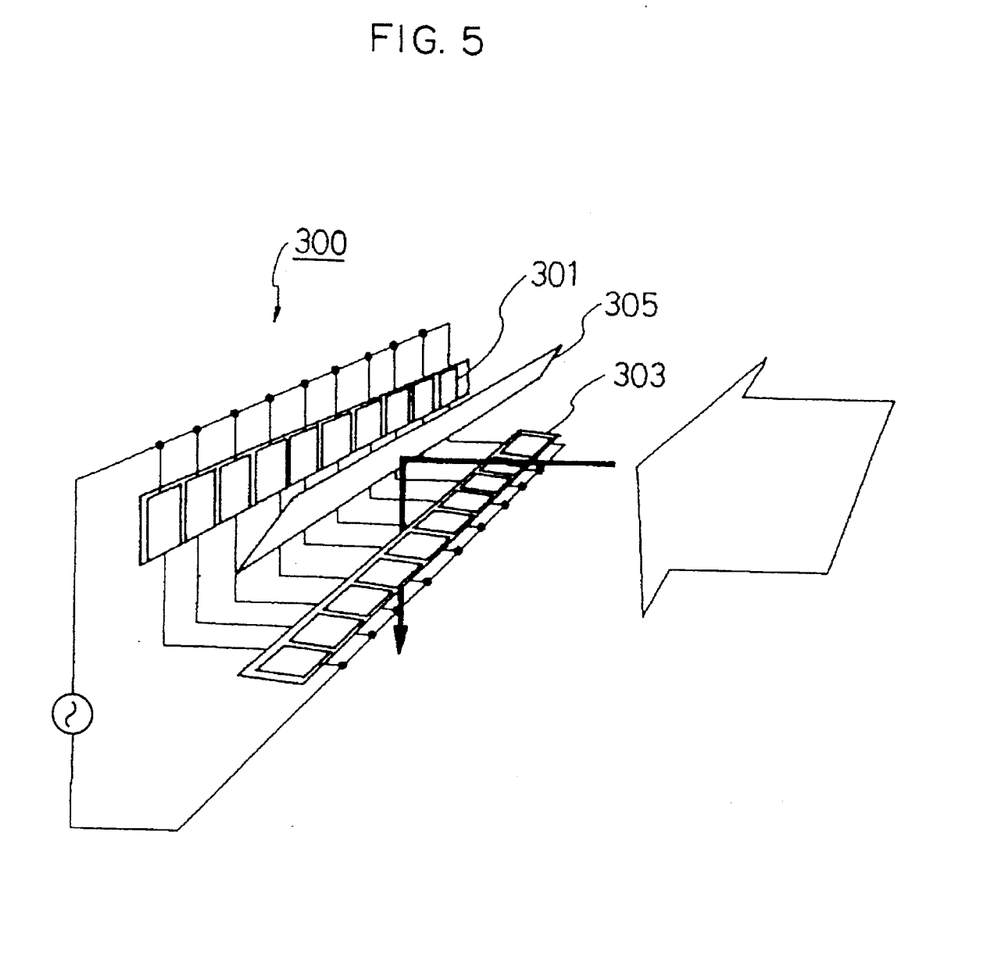
FIG. 5 is a diagram of a cross-sectional structure of a fourth example of the optical modulation means of the present invention.

Referring now to FIG. 5, a description will be given of a fourth example of the optical modulation means which is used in the image-forming apparatus of the present invention. As shown in FIG. 5, an optical modulation means 300 comprises a photoconductive cell 301 divided into segments, a liquid crystal cell 303 having segments arranged in optical correspondence with the segments of the photoconductive cell 301, and a semitransparent mirror 305 for dividing the incident image light toward the photoconductive cell 301 and toward the liquid crystal cell 303 and making the divided image light incident upon the respective cells.

Part of the image light made incident upon the semitransparent mirror 305 enters the photoconductive cell 301, while a remaining portion thereof enters the liquid crystal cell 303. The segments of the photoconductive cell and the segments of the liquid crystal cell, upon which identical image light is made incident, are respectively connected in series, and are connected in parallel with a variable-voltage power supply.

A description will now be given of the operation of the optical modulation means 300. Part of the image light made incident upon the semitransparent mirror 305 constituting a part of the optical modulation means 300 enters the photoconductive cell 301, while a remaining portion thereof enters the liquid crystal cell 303.

When the light strikes the photoconductive cell 301, the impedance of the incident portion declines. Owing to the change in impedance, an electric field corresponding to the distribution of the light intensity is applied from the variable-voltage power supply to the segments of the liquid crystal cell 303 connected in series to the segments of the photoconductive cell 301. When the electric field is applied to the liquid crystal cell 303, an electro-optic effect is produced, so that the light transmitted through the segments of the liquid crystal cell 303 is modulated in correspondence with the distribution of the incident light intensity.

In a case where optical modulation is provided only to a particular wavelength region in the spectrum of the image light, it suffices to dispose a filter for the particular wavelength region on the semitransparent mirror 305 side of the photoconductive cell 301 and to design the liquid crystal cell 303 in such a way as to modulate only the light of that wavelength. This can be readily realized by selecting dichroic dyes used for guide-host liquid crystals.

As the liquid crystals used in the optical modulation means 100 to 300, it is possible to use a twisted nematic liquid crystal, a guest-host liquid crystal, a surface-stabilized ferroelectric liquid crystal, a polymer dispersed liquid crystal, or a dynamic scattering liquid crystal.

Of the aforementioned liquid crystals, transmittances of the twisted nematic liquid crystal, the guest-host liquid crystal, and the surface-stabilized ferroelectric liquid crystal change, so that the soft or hard gradation enhancement of an image is possible by controlling the transmittances. On the other hand, since scattering coefficients of the polymer dispersed liquid crystal and the dynamic scattering liquid crystal are changed, soft gradation enhancement of an image is possible by controlling the scattering coefficients.

In addition, as image-forming apparatuses using the optical modulation means 100 to 300, it is possible to cite image printing apparatuses for printers, cameras, and the like in which a photosensitive material is used as an image-forming portion, or image-reading apparatuses for scanners, electronic cameras, and the like in which an image sensor is used as an image-forming portion. Further, as exposure systems making up the image-forming apparatuses, it is possible to cite a surface exposure system, a moving-slit exposure system, or a spot-sequential exposure system.

Figure 6:
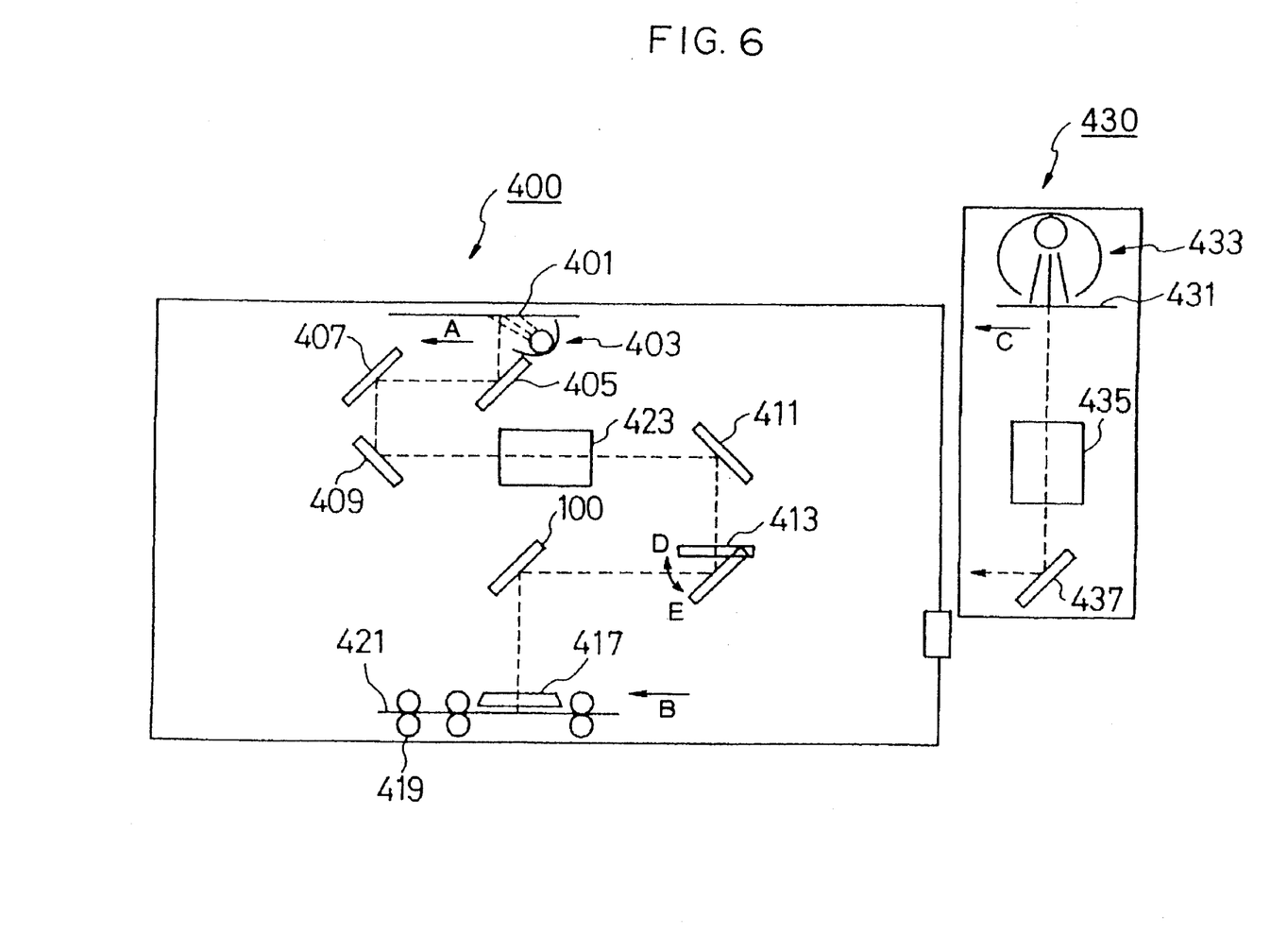
FIG. 6 is a schematic diagram of the image-forming apparatus in which one of the optical modulation means shown in FIGS. 3 to 5 is used.

Referring now to FIG. 6, a description will be given of a printer 400 having a moving-slit exposure system. As shown in FIG. 6, light from a light source 403 having a slit moving in the direction of arrow A in the drawing is applied to a reflection original 401 set in the printer 400 so as to effect scanning. Consequently, scanned image light of the reflection original 401 is obtained. This image light is reflected by a mirror 405 moving together with the light source 403, is then reflected by mirrors 407, 409, 411, and 413 and the aforementioned optical modulation means 100 that are disposed in the optical path, and is made incident upon an exposure glass 417. The image light transmitted through the exposure glass 417 effects the slit-scanning exposure of a photosensitive material 421 which is transported in the direction of arrow B by transport rollers 419. It should be noted that a lens 423 for magnification conversion is disposed in the optical path between the mirrors 409 and 411.

Furthermore, the printer 400 has a proof 430 for printing a transparency original 431 onto the photosensitive material 421. The transparency original 431 set in the proof 430 moves in the direction of arrow C in the drawing, and is irradiated with light from a light source 433 disposed above the transparency original 431. Consequently, slit-scanned image light of the transparency original 431 is obtained. This image light is transmitted through a lens 435 for magnification conversion, is reflected by a mirror 437, and is made incident upon the optical modulation means 100.

The mirror 413 disposed in the main body of the printer 400 moves to a position D in the drawing when the transparency original 431 set in the proof 430 is printed. This makes it possible for the image light obtained by the proof 430 to be made incident upon the optical modulation means 100. Meanwhile, when the reflection original 401 set in the main body is printed, the mirror 413 is moved to a position E in the drawing. This makes it possible for the image light of the reflection original 401 to be made incident upon the optical modulation means 100 by means of the mirror 413.

Accordingly, the tone of the image is changed by the above-described action of the optical modulation means 100 disposed in the optical path of the printer 400 having the above-described arrangement.

Figure 7:
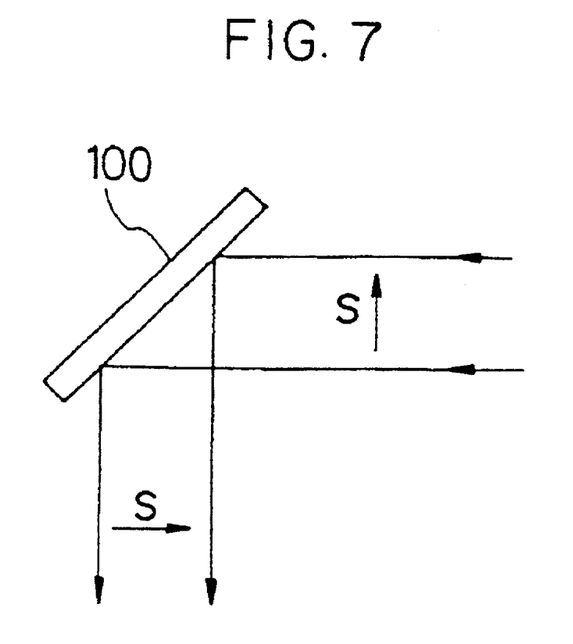
FIG. 7 is a diagram of a first layout in a case where an optical modulation means 100 shown in FIG. 3 is used in the image-forming apparatus shown in FIG. 6.

FIG. 7 shows a first example of the layout of the optical modulation means 100, in which the optical modulation means 100 is disposed by being inclined 45 degrees with respect to the optical path. The image light, which has a scanning direction in the direction of arrow S in the drawing and is made incident upon the optical modulation means 100, is modulated by the above-described action of the optical modulation means 100, thereby changing the tone of the image. The modulated image light is made incident upon the photosensitive material 421.

Figure 8:
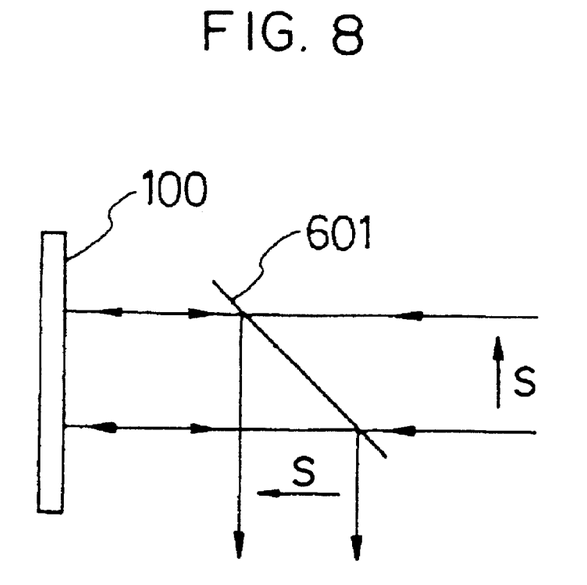
FIG. 8 is a diagram of a second layout in a case where the optical modulation means 100 shown in FIG. 3 is used in the image-forming apparatus shown in FIG. 6.

FIG. 8 shows a second example of the layout of the optical modulation means 100, in which the optical modulation means 100 is disposed perpendicularly to the optical path in the rear of the optical path of a semitransparent mirror 601 inclined 45 degrees with respect to the optical path. The image light, which has a scanning direction in the direction of arrow S in the drawing and is made incident upon the optical modulation means 100, is transmitted through the semitransparent mirror 601 and is made incident upon the optical modulation means 110. Consequently, the image light is modulated by the above-described action of the optical modulation means 100, thereby changing the tone of the image. The modulated image light is reflected by the semitransparent mirror 601 and is made incident upon the photosensitive material 421.

Figure 9:
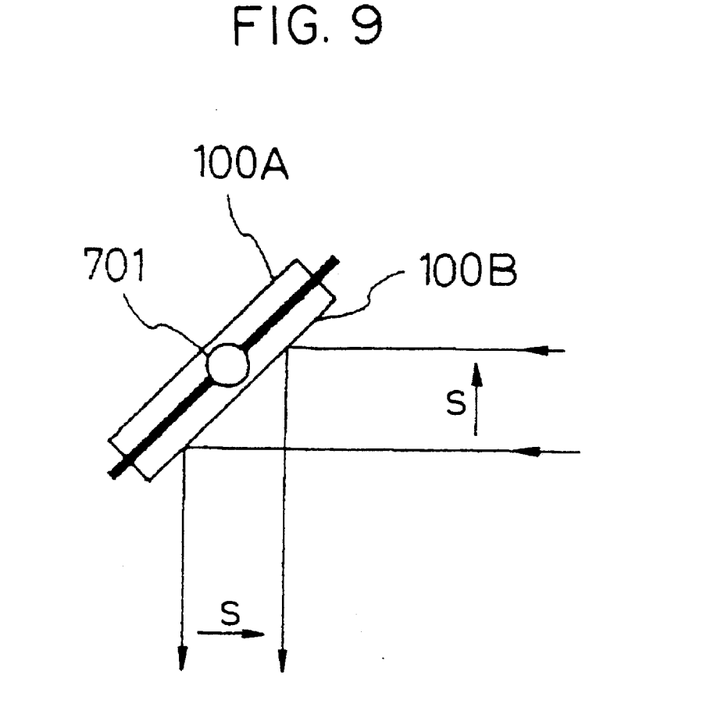
FIG. 9 is a diagram of a third layout in a case where the optical modulation means 100 shown in FIG. 3 is used in the image-forming apparatus shown in FIG. 6.

FIG. 9 shows a third example of the layout of the optical modulation means 100, in which optical modulation means 100A and 100B which have respectively different optical modulation functions and whose rear surfaces are joined together are disposed by being inclined 45 degrees with respect to the optical path. As for the functions of the two optical modulation means, a setting is provided such that the optical modulation means 100A has, for instance, a contrast-suppressing function, whereas the optical modulation means 100B has a contrast-enhancing function.

The optical modulation means 100A and 100B whose rear surfaces are joined together have a rotating shaft 701 at the center of a joining plane, and are provided in such a manner as to respectively oppose the optical path as the rotating shaft 701 rotates. The contrast of the image light, which has a scanning direction in the direction of arrow S in the drawing and is made incident upon the optical modulation means 100A or 100B, is converted to a desired contrast, and the image light is then made incident upon the photosensitive material 421.

As shown in FIGS. 7 and 9, in the case where the optical modulation means is located at an off-focus position of the optical path, it is possible to obtain an edge sharpening effect similar to that of unsharp masking in correspondence with the degree of its off-focus.

Furthermore, as shown in FIG. 9, in the case where an optical modulation means having a plurality of functions is disposed, it is possible to effect a changeover between the suppression and enhancement of contrast in correspondence with the image.

Next, in a case where image tone conversion is realized by the optical modulation means 200 shown in FIG. 4, the optical modulation means 200 is disposed on the upper surface of the exposure glass 417 constituting a part of the printer 400.

Figure 10:
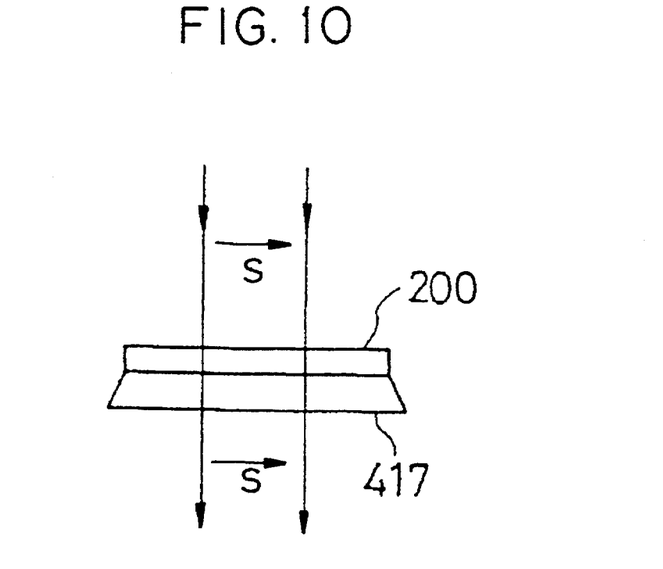
FIG. 10 is a diagram of a layout in a case where an optical modulation means 200 shown in FIG. 4 is used in the image-forming apparatus shown in FIG. 6.

Namely, the optical modulation means 200 is disposed perpendicularly to the optical path, as shown in FIG. 10. The image light, which has a scanning direction in the direction of arrow S in the drawing and is made incident upon the optical modulation means 200, is modulated by the above-described action of the optical modulation means 200, thereby changing the tone of the image. The modulated image light is made incident upon the photosensitive material 421.

In the case where the optical modulation means is disposed perpendicularly to the optical path, as shown in FIG. 10, the problem ascribable to the incidence of the image light from a diagonal direction can be obviated.

Next, in the case where image tone conversion is realized by the optical modulation means 300 shown in FIG. 5, the optical modulation means 300 is disposed at the position of the mirror 415 making up a part of the printer 400. More particularly, the semitransparent mirror 305 (see FIG. 5) making up a part of the optical modulation means 300 is disposed at the position of the mirror 415 constituting a part of the printer 400 in such a manner as to be inclined 45 degrees with respect to the optical path. Consequently, the image light made incident upon the optical modulation means 300 is modulated, and after the tone of the image is thus converted, the image light is made incident upon the photosensitive material 421.

The optical modulation means 300 has a similar construction to that of an ordinary liquid crystal panel in which the image light is directly made incident upon the liquid crystal. However, although an ordinary liquid crystal panel has a feedback control system whereby the incident light intensity is photometrically measured, and the voltage applied to the liquid crystal is controlled on the basis of the result of this photometric measurement so as to change the tone conversion rate, the optical modulation means 300 is of a self-controlled type in which the voltage applied to the liquid crystal cell is controlled by making use of the change in impedance of the photoconductive cell. Accordingly, image tone conversion can be readily attained.

If the optical modulation means is disposed by using as a reference the position of the lens 423 for magnification conversion which makes up a part of the printer 400 shown in FIG. 6, it is possible to obtain an image-tone conversion effect dependent on the magnification. Namely, if the optical modulation means is disposed in the optical path on the upstream side of the lens 423, the image-tone conversion effect is obtained with respect to the image of the original. On the other hand, if the optical modulation means is disposed in the optical path on the downstream side of the lens 423, the image-tone conversion effect is obtained with respect to the image of the original whose magnification has been converted.

The image tone conversion in the above-described various optical modulation means is dependent on the liquid crystal which constitutes a part of the optical modulation means. In other words, if a liquid crystal for modulating the light intensity is selected, it is possible to convert the tone of the image by means of the conversion of the contrast of the image.

For instance, in that portion of the optical modulation means where the intensity of the incident image light is strong, the transmittance of the liquid crystal is made small to decrease the intensity of the emergent light. The contrast of the image exposed by using this emergent light is suppressed, with the result that a more effective soft-focus effect is obtained than in a case where the image light is scattered uniformly on the entire surface.

In addition, in a liquid crystal whose transmittance is controllable, the transmittance of the liquid crystal is increased in a portion where the intensity of the light incident upon the optical modulation means is strong, thereby increasing the intensity of the emergent light. The contrast of the image exposed by using this emergent light is enhanced, so that hard gradation enhancement is thereby effected.

By changing the contrast of the image as described above, the image recorded on the original is reproduced by making effective use of the density latitude of the photosensitive material 421.

Meanwhile, in a case where a liquid crystal for modulating the scattering rate of light is selected, it is possible to convert the tone of the image by suppressing the sharpness of the image.

For example, in that portion of the optical modulation means where the intensity of the incident image light is strong, the scattering coefficient of the liquid crystal is made large to increase the scattering rate of the emergent light. The image exposed by using this emergent light has a larger image-forming width at its contour, so that soft gradation enhancement is thereby effected.

The degree of modulation of the emergent light is determined by the characteristics of the optical modulation means, e.g., the characteristics of the photoconductive portion and the liquid crystal portion, as well as the drive voltage to be applied. For example, in a case where the drive voltage is controlled in correspondence with the density of the image, it is possible to use a known feedback control system in which the density of the image recorded on the original is measured, and the drive voltage is determined on the basis of the result of this measurement.

In addition, in the case of the liquid crystal for modulating the intensity of the light, it is possible to determine the drive voltage to be applied to the liquid crystal such that appropriately modulated emergent light is obtained by controlling the intensity of the light transmitted through the liquid crystal and made incident upon the photoconductive portion.

What is claimed is:

1. An image-forming apparatus having an image-forming portion upon which image light impinges, comprising:

a beam splitter which splits a light beam passing through a negative into a writing beam and an image beam;

optical modulation means including a photoconductive member and a liquid crystal member which are electrically connected in series and are optically connected to each other, wherein a tone conversion rate of said liquid crystal member changes in correspondence with the intensity of the writing beam impinging upon said photoconductive member, and the image beam is modulated in correspondence with an intensity distribution of the writing beam by a change in tone conversion rate of said liquid crystal member;

said optical modulation means further comprising a reflector for reflecting the modulated image beam back through said liquid crystal member to emerge from said optical modulation means and thereby provide said image light.

2. An image-forming apparatus according to claim 1, wherein said liquid crystal member forms image light whose tone is converted by modulating the intensity of the image beam to provide the emergent image light.

3. An image-forming apparatus according to claim 1, wherein said liquid crystal member forms image light whose tone is converted by modulating the scattering rate of the image beam to provide the emergent image light.

4. An optical modulation means including a photoconductive member and a liquid crystal member which are electrically connected in series and are optically connected to each other, wherein a tone conversion rate of said liquid crystal member changes in correspondence with the intensity of an image beam;

wherein said optical modulation means has a reflecting-type structure in which said photoconductive member and said liquid crystal member are connected to each other such that thicknesswise directions of said photoconductive member and said liquid crystal member coincide with each other, a reflection member being provided between said photoconductive member and said liquid crystal member in such a manner as to allow part of the incident image beam to be transmitted therethrough and impinge upon said photoconductive member, and reflect a non-transmitted part back through the liquid crystal member so that modulation is effected as part of the image beam is reflected by said reflecting member to provide the image light.

5. An image-forming apparatus having an image-forming portion upon which image light impinges, comprising:

optical modulation means including a photoconductive member and a liquid crystal member which are electrically connected in series and are optically connected to each other, wherein a tone conversion rate of said liquid crystal member changes in correspondence with the intensity of a writing beam impinging upon said photoconductive member, and an image beam is modulated in correspondence with an intensity distribution of the writing beam by a change in tone conversion rate of said liquid crystal member;

wherein said photoconductive member has a plurality of photoconductive portions, and said liquid crystal member has a plurality of liquid crystal portions in correspondence with the number of said plurality of photoconductive portions and positioned at an angle thereto, each of said plurality of photoconductive portions being electrically connected in series with a corresponding one of said plurality of liquid crystal portions and disposed in optical correspondence therewith; and wherein said optical modulation means has an image-light separating member for allowing part of a light beam impinging upon said image-light separating member to be transmitted therethrough as one of the writing beam and the reading beam impinges upon one of said plurality of photoconductive portions and said plurality of liquid crystal portions, and for allowing a remaining portion of the light beam impinging upon said image-light separating member to be reflected as the other of said writing beam and said reading beam impinges upon the other of said plurality of photoconductive portions and said plurality of liquid crystal portions.

6. An image-forming apparatus having a common light source providing an image beam and an image light, and having an image-forming portion upon which image light impinges, comprising:

optical modulation means including a photoconductive member and a liquid crystal member which are electrically connected in series and are optically connected to each other, wherein a tone conversion rate of said liquid crystal member changes in correspondence with the intensity of the image beam incident upon said photoconductive member, and the image light is modulated in correspondence with an intensity distribution of the image beam by a change in tone conversion rate of said liquid crystal member, so as to allow the image light to emerge toward said image-forming portion;

a first guide member for guiding the image beam to said optical modulation means;

a second guide member for guiding the image light modulated by said optical modulation means to said image-forming portion.

7. An image-forming apparatus according to claim 6, wherein said liquid crystal member forms image light whose tone is converted by modulating the intensity of the emergent image light.

8. An image-forming apparatus according to claim 6, wherein said liquid crystal member forms image light whose tone is converted by modulating the scattering rate of the emergent image light.

9. An image-forming apparatus according to claim 6, wherein said optical modulation means has a reflecting-type structure in which said photoconductive member and said liquid crystal member are connected to each other such that thicknesswise directions of said photoconductive member and said liquid crystal member coincide with each other, a reflection member being provided between said photoconductive member and said liquid crystal member in such a manner as to allow part of the incident image beam to be transmitted therethrough and reach said photoconductive member, and to reflect a non-transmitted part back through the liquid crystal member so that modulation is effected as part of the image beam is reflected by said reflecting member.

10. An image-forming apparatus according to claim 9, wherein said optical modulation means comprises two types of optical modulation devices having mutually different modulation functions, said optical modulation devices being joined together at thicknesswise surfaces thereof, a rotating shaft being provided at a substantially intermediate portion of a joining plane to effect a changeover between the modulation functions as said rotating shaft rotates, said optical modulation means being disposed such that the image beam impinges upon one of said optical modulation devices at an angle of about 45° with respect to the thicknesswise direction of the optical modulation means.

11. An image-forming apparatus according to claim 9, wherein said optical modulation means is disposed such that the image beam impinges upon said optical modulation means at an angle of about 45° with respect to the thicknesswise direction.

12. An image-forming apparatus according to claim 9, wherein said optical modulation means is disposed such that the image beam impinges upon said optical modulation means from a direction parallel to the thicknesswise direction, said second guide member having a semitransparent mirror disposed in an optical path on an upstream side of said optical modulation means to reflect the image light reflected from said optical modulation means so as to change the optical path.

13. An image-forming apparatus according to claim 6, wherein said optical modulation means has a transmitting-type structure in which said photoconductive member and said liquid crystal member are connected to each other such that thicknesswise directions of said photoconductive member and said liquid crystal member coincide with each other, modulation being effected as the image beam is transmitted through said photoconductive member and said liquid crystal member.

14. An image-forming apparatus according to claim 6, wherein said photoconductive member has a plurality of photoconductive portions, and said liquid crystal member has a plurality of liquid crystal portions in correspondence with the number of said plurality of photoconductive portions, each of said plurality of photoconductive portions being electrically connected in series with a corresponding one of said plurality of liquid crystal portions and disposed in optical correspondence therewith, and wherein part of the image beam impinges upon each of said plurality of photoconductive portions and another part of said image beam impinges upon said plurality of liquid crystal portions that are disposed in correspondence with the photoconductive portions, and a modulation rate of each of corresponding ones of said plurality of liquid crystal portions is changed in correspondence with the intensity of the part of the image beam impinging upon each of said plurality of photoconductive portions so as to modulate said another part of the image beam to provide said image light.

15. An image-forming apparatus according to claim 14, wherein said optical modulation means has an image-light separating member for allowing part of the image beam impinging upon said image-light separating member to be transmitted therethrough so as to impinge upon one of said plurality of photoconductive portions and said plurality of liquid crystal portions, and for allowing a remaining portion of the image light incident upon said image-light separating member to be reflected so as to impinge upon the other of said plurality of photoconductive portions and said plurality of liquid crystal portions.

16. An image-forming apparatus having an image-forming portion upon which image light impinges, and wherein an image beam is made into a writing beam and a reading beam, comprising:

optical modulation means including a pair of image-light incident portions arranged in face-to-face relation with each other, said optical modulation means being disposed such that the intensity of the writing beam impinging from one of said pair of image-light incident portions is modulated in correspondence with the intensity of the writing beam impinging from the other of said pair of image-light incident portions and a drive voltage to be applied to said optical modulation means, and that the reading beam impinging from said one of said pair of image-light incident portions emerges from said optical modulation means to constitute said image light; and image-light guiding means for guiding the image light emerging from said optical modulation means to a photosensitive material.

17. An image-forming apparatus according to claim 16, further comprising:

controlling means for controlling said optical modulation means in correspondence with a density distribution of the image light emerging from said one of said pair of image-light incident portions so as to expose the photosensitive material with a predetermined exposure amount for allowing the density of the image light to correspond to the latitude of the density of the photosensitive material.

18. An image-forming apparatus according to claim 16, wherein said optical modulation means includes a photoconductive member and a liquid crystal member which are electrically connected in series and are optically separated from each other, and wherein the intensity of the reading beam impinging from said one of said pair of image-light incident portions and impinging upon said liquid crystal member is modulated as the drive voltage to be applied to said liquid crystal member is changed in correspondence with the intensity of the writing beam impinging from the other of said pair of image-light incident portions and impinging upon said photoconductive member.

19. An image-forming apparatus according to claim 16, further comprising an image-light separating member adapted to separate the image beam into said writing beam and said reading beam by transmitting part of the image beam therethrough and reflecting part of the image beam therefrom so as to make the two portions of the image beam incident upon said pair of image-light incident portions respectively.

* * * * *